United States Patent [19]
Clark et al.

[11] 3,805,961
[45] Apr. 23, 1974

[54] TUBE PRESSURE FILTERS

[75] Inventors: Norman Owen Clark, Par; Ralph Derek Gwilliam, St. Austell, both of England

[73] Assignee: English Clays Lovering Pochin & Company Limited, St. Austell, Cornwall, England

[22] Filed: July 24, 1972

[21] Appl. No.: 274,657

[30] Foreign Application Priority Data
July 30, 1971  Great Britain .................... 36087/71

[52] U.S. Cl. ................. 210/350, 100/112, 100/211, 210/356
[51] Int. Cl. ........................ B01d 35/00, B30b 9/06
[58] Field of Search .......... 210/350, 354, 356, 225, 210/231; 100/110, 112, 114, 116, 117, 126, 127, 211

[56] References Cited
UNITED STATES PATENTS

| 2,027,681 | 1/1936 | Durane et al. ...................... 210/356 |
| 2,460,084 | 1/1949 | Hebo ................................... 210/356 |
| 3,326,382 | 6/1967 | Bozek et al. ......................... 210/356 |

FOREIGN PATENTS OR APPLICATIONS

| 854,465 | 10/1970 | Canada ............................... 210/350 |
| 1,172,201 | 6/1964 | Germany ............................ 210/356 |

*Primary Examiner*—Theodore A. Granger
*Attorney, Agent, or Firm*—Larson, Taylor & Hinds

[57] ABSTRACT

A tube pressure filter of the type which comprises a pair of generally coaxial tubular bodies arranged one within the other and adapted to be supported in a generally upright position, an impermeable elastic sleeve disposed within and secured to the outer tubular body, a filter element disposed around and supported by the inner tubular body, an outlet for the discharge from the tube pressure filter of filtrate which has passed through the filter element, and means for displacing the tubular bodies axially relative to one another between first and second positions, the arrangement being such that in the first position of said tubular bodies they co-operate with each other to define a closed annular chamber which is divided into generally coaxial and non-intercommunicating inner and outer compartments by said impermeable elastic sleeve, the inner compartment having an inlet for a wet particulate solid material and the outer compartment having an inlet for a hydraulic fluid under pressure, and in the second position of said tubular bodies said annular chamber is open to enable particulate solid material to be discharged from the inner compartment, is provided with a flexible filter element and an inner tubular body whose outer wall is provided with one or more grooves the disposition of the groove or grooves and the construction of the filter element being such that when pressure is applied substantially uniformly to the upstream side of the filter element the latter flexes and extends into the groove or grooves.

13 Claims, 4 Drawing Figures a) b)

TUBE PRESSURE FILTERS

BACKGROUND OF THE INVENTION

This invention relates to pressure filters.

One type of pressure filter which is relatively recent addition to a large range of different types of pressure filter is a tube pressure filter which comprises an annular chamber formed between a pair of co-axially disposed tubular bodies arranged one within the other and adapted to be supported in a generally upright position, the chamber being divided into inner and outer non-intercommunicating compartments by an impermeable elastic sleeve secured to the outer of the two tubular bodies and the arrangement being such that, in use, with the tubular bodies disposed in an upright position, a material to be pressure filtered is introduced into the inner compartment which contains a filter element, and a hydraulic fluid under pressure is introduced into the outer compartment so as to compress the material to be pressure filtered against the filter element. A more detailed description of tube pressure filters of this type and of their operation is to be found inter alia in British Pat. Specifications Nos. 907,485, 1,240,465 and 1,240,466.

Problems which arise in the construction and operation of tube pressure filters of the kind described in, for example, British Pat. Specifications Nos. 1,240,465 and 1,240,466, include difficulty in fitting the filter element around the inner tubular body so that it operates satisfactorily and the fact that the life of a filter element is not as long as desired.

It is an object of the present invention to provide a tube pressure filter in which the aforesaid problems are alleviated.

SUMMARY OF THE INVENTION

According to the present invention there is provided a tube pressure filter which comprises a pair of generally coaxial tubular bodies arranged one within the other and adapted to be supported in a generally upright position, an impermeable elastic sleeve disposed within and secured to the outer tubular body, a flexible filter element disposed around and supported by the inner tubular body, an outlet for the discharge from the tube pressure filter of filtrate which has passed through the filter element, and means for displacing the tubular bodies axially relative to one another between first and second positions, wherein the arrangement is such that in the first position of said tubular bodies they cooperate with each other to define a closed annular chamber which is divided into generally coaxial and nonintercommunicating inner and outer compartments by said impermeable elastic sleeve, the inner compartment having an inlet for a wet particulate solid material and the outer compartment having an inlet for a hydraulic fluid under pressure, and in the second position of said tubular bodies said annular chamber is open to enable particulate solid material to be discharged from the inner compartment, and wherein the outer wall of the inner tubular body is provided with one or more grooves the disposition of the groove or grooves and the construction of the filter element being such that when pressure is applied substantially uniformly to the upstream side of the filter element the latter flexes and extends into the groove or grooves.

DESCRIPTION OF THE PREFERRED EMBODIMENTS

The grooves are preferably shallow, the depth, $d$, of each groove advantageously being not greater than one half of the width, $w$, of the groove; the depth of each groove is preferably not less than one eighth of the width of the groove. (The depth of a groove is the shortest distance measured from the bottom of the groove to the original cylindrical surface of the inner tubular body and not to a straight line joining the shoulders of the groove.) The ends of each groove are advantageously tapered, and the sum of the widths of all the grooves in any annular segment of the inner tubular body is preferably at least 80 percent of the circumference of the annular segment so that adjacent grooves are separated only by narrow strips of the original cylindrical surface. The sum of the widths of all the grooves in any one annular segment of the inner tubular body is preferably substantially equal to the sum of the widths of all the grooves in any other annular segment of the inner tubular body; it will be appreciated, however, that this relationship may not hold for the annular segments of the inner tubular body which supports the effective ends of the filter element since there may be in these annular segments a plurality of tapered ends of grooves. The profile of each groove is preferably such that sharp edges are avoided.

In a preferred embodiment of the invention the outer wall of the inner tubular body is provided with a plurality of grooves each extending longitudinally of the inner tubular body and substantially the full length of that part of the inner tubular body which supports the effective length of the filter element; with this arrangement there are advantageously provided from 6 to 100 grooves.

In another embodiment of the invention, there are provided on the outer wall of the inner tubular body a plurality of grooves each extending longitudinally of the inner tubular body over a fraction of the length of that part of the inner tubular body which supports the effective length of the filter element; with this arrangement adjacent grooves will be staggered to ensure that each annular segment of the inner tubular body is provided with approximately the same area of grooved surface.

In another embodiment of the invention, there are provided one or more grooves which extend helically over the surface of the inner tubular body; with this arrangement the pitch of the helix should not be too flat.

The filter element, or septum, which is disposed around and supported by the inner tubular body is advantageously constructed so that it comprises (a) a wire mesh sleeve which is of a size such that it fits closely over the inner tubular body and which has not more than 200 wires to the inch in any one direction but at least 60 wires to the inch in at least one direction, and (b) a filter cloth sleeve which is disposed over the wire mesh sleeve, which has a pore size sufficiently small to prevent the passage therethrough of material to be pressure filtered, and which preferably has elastic properties. Preferably, a backing cloth of thickness not greater than 2 mm is disposed between the wire mesh sleeve and the filter cloth sleeve. The filter element should be flexible so that when pressure is applied substantially uniformly to the upstream side of the filter element, the filter element flexes and extends into the groove or grooves formed in the outer wall of the inner tubular body.

During that stage of the operating cycle of the tube pressure filter when the inner compartment is filled with feed material, and hydraulic fluid at high pressure is supplied to the outer compartment, the filter element is pressed into the grooves so that, for example, the wire mesh sleeve, the backing cloth (if used) and the filter cloth sleeve are stretched taut; this avoids the need to shrink the filter cloth sleeve to fit over the wire mesh sleeve or over the backing cloth (if used). There is formed on the filter element a filter cake of varying thickness. At the completion of the pressing stage in the operating cycle of the tube pressure filter, i.e., when the flow of filtrate through the filter element has substantially stopped, the hydraulic fluid is withdrawn by suction from the outer compartment and the tubular bodies of the tube pressure filter are displaced axially relative to one another to their second position. At this stage, if the filter cloth sleeve of the filter element has elastic properties it will have a tendency to relax and to return to a substantially cylindrical shape which may be sufficient to discharge the filter cake.

With a tube pressure filter in accordance with this invention the risk of folds or wrinkles occuring in the filter element is virtually eliminated so that an appreciable improvement in the life of the filter element is obtained. Also since the filter element, in operation, takes up a fluted surface rather than a cylindrical surface there is an increase in filtering area of up to about 5 percent for a given overall diameter of the central cylindrical section of the inner tubular body.

In the construction of the tube pressure filter, the tubular bodies advantageously each comprise a cylindrical central section and end sections adapted to cooperate with the adjacent end sections of the other tubular body to form a seal when the tubular bodies are in their first position. Preferably, the inner tubular body comprises a central cylindrical section, and upper and lower end sections, each of which end sections includes a radially outwardly extending flange portion, which is of a larger diameter than said central cylindrical section, and a fairing mounted on or adjacent to said flange portion so as to extend around said central cylindrical section and an end of the filter element, the end sections of the inner tubular body being adapted to cooperate with adjacent portions of the outer tubular body to form a seal therewith when said tubular bodies are in their first position. With this construction of the inner tubular body, the grooves in the outer wall of the inner tubular body preferably stop short of the fairings at each end of the inner tubular body. The end sections of the inner tubular body are advantageously constructed in the form of caps which close the inner tubular body, and the inner tubular body is advantageously provided with a number of apertures through which filtrate can flow to the interior of the inner tubular body where it can be removed by a siphon tube. A compressed air line can also be led into the interior of the inner tubular body so that, if necessary, one or more discrete blasts of compressed air may be provided on the downstream side of the filter element to ensure that complete filter cake discharge takes place on each cycle.

For a better understanding of the invention and to show how the same may be carried into effect, reference will now be made, by way of example, to the accompanying drawings in which.

Figure 1:
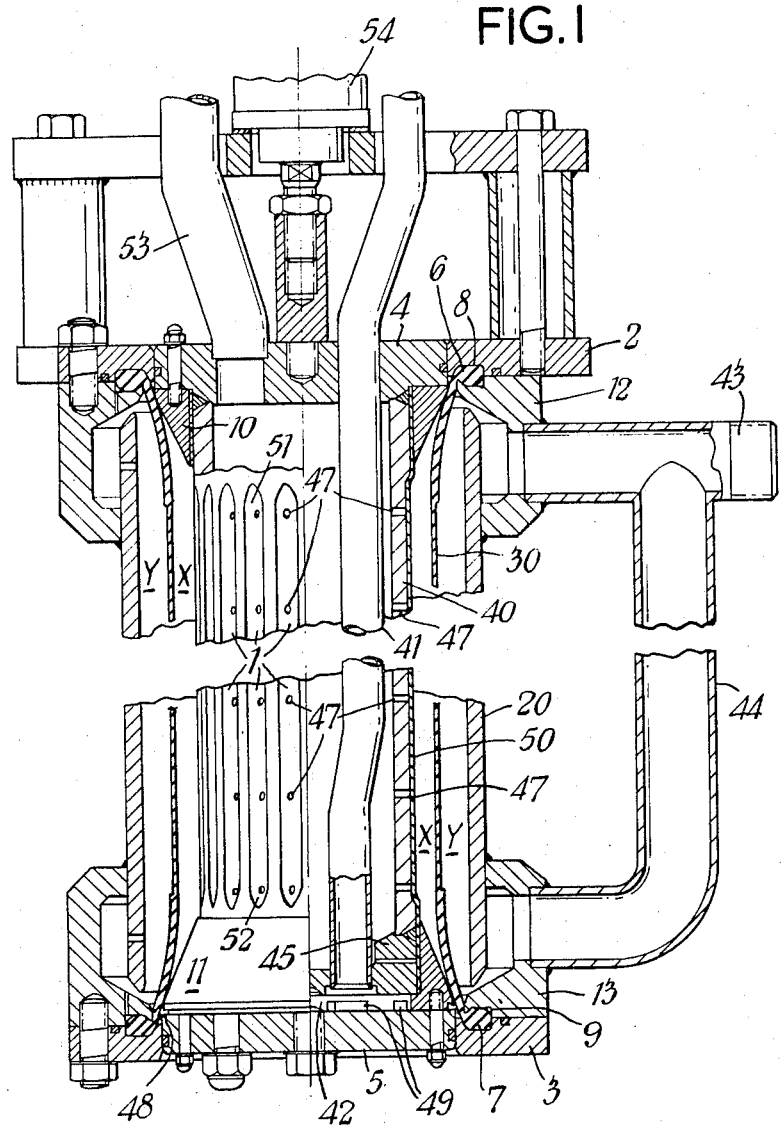
FIG. 1 is a cross-section, taken through the longitudinal axis, of a tube pressure filter in accordance with the invention with part of the inner tubular body shown unsectioned.

The tube pressure filter shown in FIG. 1 includes an outer tubular body, an inner tubular body, an impermeable elastic sleeve, a flexible filter element, an outlet for the discharge of filtrate, an inlet for material to be treated, an inlet/outlet for a hydraulic fluid, and means for displacing the tubular bodies axially relative to one another.

The outer tubular body essentially comprises a central cylindrical section 20, and two end sections comprising flanges 2 and 3 respectively and annular galleries 12 and 13, respectively. The end section comprising flange 2 and the annular gallery 12, and the end-section comprising flange 3 and the annular gallery 13, are each constructed and arranged so that they provide respective recesses 8 and 9 in which are located annular headings 6 and 7, respectively, constituting the ends of an impermeable elastic sleeve 30. An outer compartment Y is defined between the impermeable elastic sleeve 30 and the outer tubular body. A conduit 43 is provided for the supply and withdrawal of hydraulic fluid to the outer compartment, this conduit 43 is connected to a further conduit 44 which connects the upper annular gallery 12 to the lower annular gallery 13.

Figure 2:
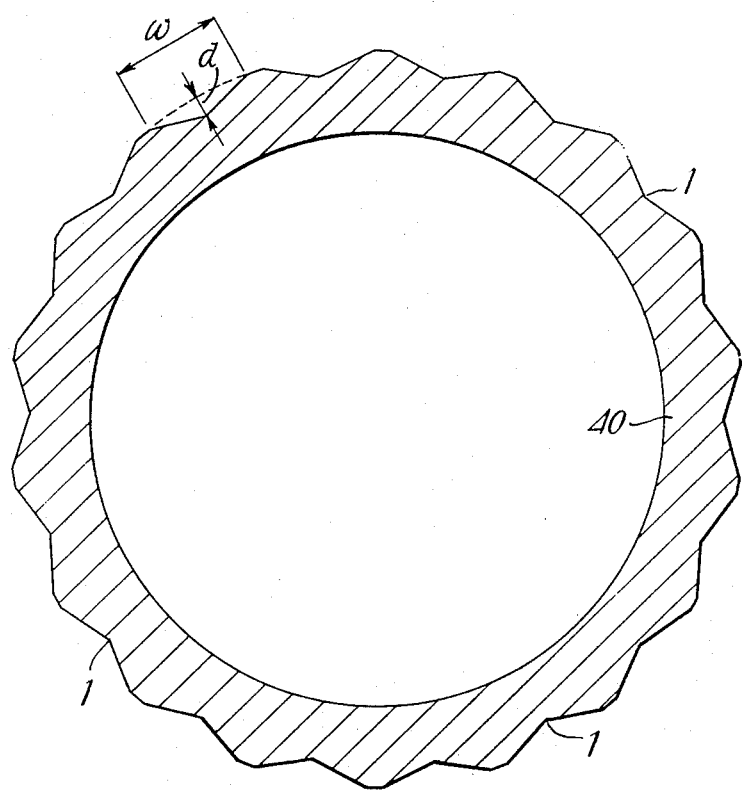
FIG. 2 is a cross-section of the inner tubular body of a tube pressure filter in accordance with the invention.

The inner tubular body essentially comprises a central cylindrical section 40 formed with a number of apertures such as those indicated at 47, an inner end-cap 45 at the lower end of the inner tubular body, and the outer end caps 4 and 5 each of which is provided with a radially outwardly extending flange portion on which is mounted frusto-conical fairings 10 and 11, respectively. The outer wall of the inner tubular body has cut into it eighteen grooves, 1, the profile of which is best seen in FIG. 2. The overall diameter of the inner tubular body is 168 mm, the width, $w$, of each groove is 25 mm and the depth, $d$, of each groove is 4 mm. The central cylindrical section 40 supports a filter element 50. The grooves have no sharp edges which would cause lines of concentrated stress in the filter element. The upper and lower ends 51 and 52, respectively, of each groove are provided with a gentle taper and the ends of each groove stop short of the inner rims of the upper and lower frusto-conical fairings 10 and 11.

The impermeable elastic sleeve 30, which is secured in a liquid-tight manner to the outer tubular body, defines with the inner tubular body an inner compartment X.

An inlet, to enable a wet particulate solid material to be pressure filtered to be introduced under pressure into compartment X, comprises a plurality of slots 49, which are formed in the castellated lower edge of the fairing 11, the slots 49 communicating with an annular groove 48 and with a chamber 42 to the latter of which a slurry of the material to be pressure filtered can be fed via a tube 41.

There is provided a siphon tube (not shown) which removes from the interior of the inner tubular body filtrate which has passed through the apertures 47.

A compressed air pipe 53 extends into the interior of the inner tubular body and can be used to assist in the discharge of filter cake.

A jack 54 enables the inner and outer tubular bodies to be displaced axially relative to one another.

In the operation of the tube pressure filter, a material to be pressure filtered is introduced into the compartment X through pipe 41, chamber 42, the slots 49 and groove 48, and a hydraulic fluid is introduced into the compartment Y through conduits 43 and 44. The pressure of the hydraulic fluid causes the impermeable elastic sleeve 30 to compress the material being pressure filtered so as to express filtrate through the filter element and through the apertures 47 into the inner tubular body. The siphon tube then removes filtrate from the inner tubular body. The hydraulic fluid is evacuated from the outer compartment Y, and thereafter the inner and outer tubular bodies are displaced axially relative to one another by means of jack 54 so that filter cake which is supported on the filter element can be discharged from the inner compartment.

The provision of grooves 1 in the outer wall of the inner tubular body enables the filter element 50 to be stretched into the grooves while the material being pressure filtered is compressed. When the hydraulic fluid is withdrawn from compartment Y the natural resilience of the filter element 50 tends to draw it once again into a substantially cylindrical shape and the filter cake supported on the filter element splits into vertical strips which fall off when the inner and outer tubular bodies are displaced axially relative to one another. Blasts of compressed air may also be applied via pipe 53 to the inside of the inner tubular member at this stage to ensure that the discharge of filter cake is complete. Since the filter element 50, when stretched into the grooves 1, has a corrugated surface the filter cake which is formed thereon is of variable thickness which facilitates its discharge in vertical strips.

The filtering area of the embodiment described above is about 3.7 percent greater than the filtering area of a non-corrugated cylindrical inner tubular body of the same overall diameter.

More detailed discussion of the preferred method of operating the embodiment of a tube pressure filter described above is given in Great Britain Pat. Specifications Nos. 1,240,465 and 1,240,466.

Figure 3:
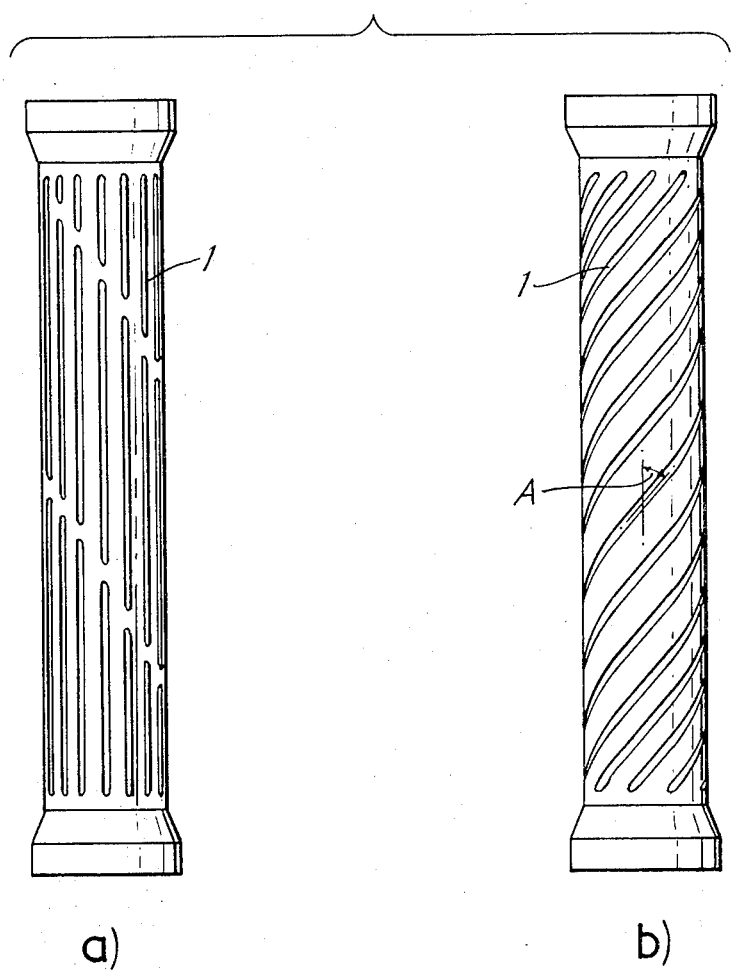
FIGS. 3a and 3b show diagrammatically alternative embodiments of the inner tubular body of tube pressure filters according to the invention.

FIGS. 3a and 3b show alternative arrangements of the groove or grooves 1 formed in the outer wall of the inner tubular body. With the helical groove shown in FIG. 3b the angle A should not be greater than 45°.

In all the embodiments of the invention described above, the sum of the widths of all the grooves in any annular segment of the inner tubular body is greater than 80 percent of the circumference of the annular segment. Moreover, the sum of the widths of all the grooves in any one annular segment of inner tubular body is substantially equal to the sum of the widths of all the grooves in any other annular segment of the inner tubular body.

The invention is further illustrated by the following Example.

EXAMPLE

A tube pressure filter having a grooved inner tubular body as described and with the dimensions given above in connection with FIGS. 1 and 2 was provided with a filter element 50 which comprised three coaxial sleeves, namely a wire mesh sleeve, a backing cloth sleeve and a filter cloth sleeve. The wire mesh sleeve was manufactured from Fourdrinier paper machine wire woven in a Hollander weave so that there were 10 wires per inch (4 per cm) in the longitudinal direction and 100 wires per inch (40 per cm) in the circumferential direction. The wire was cut to the size such that when the two longer sides were joined to form a cylindrical sleeve, this sleeve just slid over the surface of the inner tubular body. The sides of the sleeve were joined by soldering the seam was ground smooth to minimise abrasion of the backing and filter cloths. The backing cloth sleeve was of "TERYLENE" felt which had been made by forming a mat of randomly laid short staple fibres and then applying heat to bond the fibres together. The backing cloth sleeve was made to be a loose sliding fit over the wire mesh sleeve. The filter cloth sleeve was of "TERYLENE" having a weight of 10.25 oz per square yard (348 g. per square metre) which had been woven as a tube of circumference 21.5 inches (546 mm) from three strands of 125 denier continuous monofilament yarn. The circumference of the inner tubular body when fitted with the wire mesh sleeve and backing cloth sleeve was approximately 535 mm so the filter cloth could be pulled easily over the backing cloth sleeve.

It was found that in operation the wire mesh sleeve and backing cloth tended to conform to the corrugated surface of the inner tubular body and the filter cloth was forced into the corrugations during the pressing stage of the operating cycle of the tube pressure filter and to revert to a substantially cylindrical shape during the cake discharge stage. No wrinkles or folds developed in the filter cloth during use.

After a total of 4,467 cycles the filter cloth was removed and tested under a low power microscope and subjected to tensile tests. Both the appearance and tensile strength were indistinguishable from the results obtained with an unused cloth. The average life of a filter cloth on a tube pressure filter with a conventional, uncorrugated inner tubular body was found to be about 3,000 cycles.

We claim:

1. In a tube pressure filter which comprises a pair of generally coaxial tubular bodies arranged one within the other and adapted to be supported in a generally upright position, an impermeable elastic sleeve disposed within and secured to the outer tubular body, a filter element disposed around and supported by the inner tubular body, an outlet for the discharge from the tube pressure filter of filtrate which has passed through the filter element, and means for displacing the tubular bodies axially relative to one another between first and second positions, the arrangement being such that in the first position of said tubular bodies they cooperate with each other to define a closed annular chamber which is divided into generally coaxial and non-intercommunicating inner and outer compartments by said impermeable elastic sleeve, the inner compartment having an inlet for a wet particulate solid material and the outer compartment having an inlet for a hydraulic fluid under high pressure, and in the second position of said tubular bodies said annular chamber is open to enable particulate solid material to be discharged from the inner compartment, the improvement wherein said filter element is flexible and the outer surface of said inner tubular body is provided with at least one groove having a depth which is not greater than one-half and not less than one-eighth of the width thereof, the disposition of the groove on the outer surface of the inner tubular body and the size and construction of the filter element being such that when hydraulic fluid under high pressure is supplied to the upstream side of the filter element the latter flexes, extends into the groove and is stretched taut so that a filter cake formed on the filter element will be of varying thickness.

2. A tube pressure filter as claimed in claim 1, wherein the groove is helically disposed about the outer surface of the inner tubular body.

3. A tube pressure filter as claimed in claim 2, wherein the sum of the widths of all the groove segments in any annular segment of the inner tubular body is at least 80 percent of the circumference of the annular segment.

4. A tube pressure filter as claimed in claim 2, wherein the sum of the widths of all the grooves segments in any one annular segment of the inner tubular body is substantially equal to the sum of the widths of all the groove segments in any other annular segment of the inner tubular body.

5. A tube pressure filter as claimed in claim 1, wherein the outer surface of the inner tubular body is provided with a plurality of grooves.

6. A tube pressure filter as claimed in claim 5, wherein each groove extends longitudinally of the inner tubular body and substantially the full length of that part of the inner tubular body which supports the effective length of the filter element.

7. A tube pressure filter as claimed in claim 6, wherein there are provided from 6 to 100 grooves.

8. A tube pressure filter as claimed in claim 6, wherein the sum of the widths of all the groove segments in any annular segment of the inner tubular body is at least 80 percent of the circumference of the annular segment.

9. A tube pressure filter as claimed in claim 6, wherein the sum of the widths of all the groove segments in any one annular segment of the inner tubular body is substantially equal to the sum of the widths of all the groove segments in any other annular segment of the inner tubular body.

10. A tube pressure filter as claimed in claim 1, wherein the filter element comprises (a) a wire mesh sleeve which is of a size such that it fits closely over the inner tubular body and which has not more than 200 wires to the inch in any one direction but at least 60 wires to the inch in at least one direction, and b) an extensible filter cloth sleeve which is disposed over the wire mesh sleeve and which has elastic properties.

11. A tube pressure filter as claimed in claim 10, wherein a backing cloth of thickness not greater than 2 mm is disposed between the wire mesh sleeve and the filter cloth sleeve.

12. A tube pressure filter as claimed in claim 1, wherein the tubular bodies each comprise a cylindrical central section and end sections adapted to co-operate with the adjacent end sections of the other tubular body to form a seal when the tubular bodies are in their first position, the inner tubular body comprising upper and lower end sections, each of which end sections includes a radially outwardly extending flange portion, which is of a larger diameter than said central cylindrical section, and a fairing mounted on or adjacent to said flange portion so as to extend around said central cylindrical section and an end of the filter element, and wherein the grooves in the outer surface of the inner tubular body stop short of the fairings at each end of the inner tubular body.

13. A tube pressure filter as claimed in claim 1 further comprising means for feeding to the outer compartment a hydraulic fluid under high pressure of at least 250 p.s.i.

* * * * *